(12) United States Patent
Liu (10) Patent No.: US 11,436,748 B2
(45) Date of Patent: Sep. 6, 2022

(54) VOLUME MEASUREMENT METHOD AND SYSTEM, APPARATUS AND COMPUTER-READABLE STORAGE MEDIUM

(71) Applicant: SF Technology Co., Ltd., Shenzhen (CN)

(72) Inventor: HuiQuan Liu, Shenzhen (CN)

(73) Assignee: SF TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/280,790

(22) PCT Filed: Jun. 6, 2019

(86) PCT No.: PCT/CN2019/090310
§ 371 (c)(1),
(2) Date: Mar. 26, 2021

(87) PCT Pub. No.: WO2020/062918
PCT Pub. Date: Apr. 2, 2020

(65) Prior Publication Data
US 2022/0012907 A1    Jan. 13, 2022

(30) Foreign Application Priority Data
Sep. 28, 2018    (CN) .......................... 201811141066.7

(51) Int. Cl.
*G06T 7/62*    (2017.01)
*G06T 7/13*    (2017.01)
(Continued)

(52) U.S. Cl.
CPC .............. *G06T 7/62* (2017.01); *G01B 11/22* (2013.01); *G06T 7/13* (2017.01); *G06T 7/521* (2017.01);
(Continued)

(58) Field of Classification Search
None
See application file for complete search history.

(56) References Cited

U.S. PATENT DOCUMENTS

2017/0302905 A1\* 10/2017 Shteinfeld ............ H04N 13/204
2019/0139251 A1\* 5/2019 Zhang ....................... G06T 7/11

FOREIGN PATENT DOCUMENTS

| CN | 104197834 A | 12/2014 |
|---|---|---|
| CN | 106839995 A | 6/2017 |

(Continued)

OTHER PUBLICATIONS

International Patent Application No. PCT/CN2019/090310, International Search Report & Written Opinion dated Sep. 17, 2019, 11 pages.

(Continued)

*Primary Examiner* — Samuel D Fereja
(74) *Attorney, Agent, or Firm* — Loza & Loza, LLP; Michael F. Fedrick (57) ABSTRACT

The present patent application relates to a volume measurement method and system, an apparatus and a computer-readable storage medium. The method comprises: collecting a first information of a measurement area when there is no object to be measured and a first depth image information of the measurement area when there is an object to be measured under a current viewing angle based on a 3D vision system located above the measurement area; identifying an outer contour of the object to be measured by comparing gray values of the first information and the first depth image information collected under different viewing angles to obtain a first depth information of the outer contour of the object to be measured, and filling in an area defined by the outer contour of the object to be measured to obtain a target of object to be measured and size information of the target of object to be measured; performing block division on an (Continued)

outer contour area of the object to be measured according to a preset relationship between the first depth information and divided blocks to generate block information; and obtaining a volume of the object to be measured according to a preset relationship among the block information, the size information of the target of object to be measured, and a volume of the object to be measured. According to the method, measurement is performed based on 3D vision, and the objects to be measured are directly measured, so the measurement speed is fast, the measurement accuracy is high, and the measurement range is large.

9 Claims, 3 Drawing Sheets

(51) Int. Cl.
| | |
|---|---|
| *G06T 7/521* | (2017.01) |
| *G06T 7/593* | (2017.01) |
| *H04N 13/254* | (2018.01) |
| *H04N 13/239* | (2018.01) |
| *G01B 11/22* | (2006.01) |

(52) U.S. Cl.
CPC ........... *G06T 7/593* (2017.01); *H04N 13/239* (2018.05); *H04N 13/254* (2018.05); *G06T 2207/10028* (2013.01); *G06T 2207/20021* (2013.01)

(56) References Cited

FOREIGN PATENT DOCUMENTS

| | | | |
|---|---|---|---|
| CN | 109443196 A | 3/2019 | |
| EP | 3232404 A1 | 10/2017 | |
| JP | 11211438 | 1/1998 | |
| JP | 2003247805 | 2/2002 | |
| JP | 2009025066 | 7/2007 | |
| NO | 330423 B1 * | 4/2011 | ............ G01B 11/04 |

OTHER PUBLICATIONS

Office Action in corresponding Chinese Patent Application No. 201811141066.7 dated Oct. 14, 2019, 10 pages.
Japanese Patent Office, Notice of Reasons for Refusal dated Jun. 7, 2022 in corresponding Japanese Patent Application No. JP20210517211.

* cited by examiner

VOLUME MEASUREMENT METHOD AND SYSTEM, APPARATUS AND COMPUTER-READABLE STORAGE MEDIUM

CROSS-REFERENCE TO RELATED APPLICATIONS

The present patent application is the U.S. national stage of International Patent Application No. PCT/CN2019/090310, filed on Jun. 6, 2019, and claims the benefit of priority from Chinese patent application No. 201811141066.7 filed with the China National Intellectual Property Administration on Sep. 28, 2018 and entitled "A VOLUME MEASUREMENT METHOD AND SYSTEM". The disclosures of the foregoing applications are incorporated herein by reference in their entirety.

TECHNICAL FIELD

A method of measuring volume by collecting a first piece of information about a measurement area and a first depth image of the area under a current viewing angle based on a 3D vision system located above the area; identifying an outer contour of the object to be measured by comparing gray values of the first information and the first depth image to obtain a first depth information of the outer contour of the object, and filling in an area defined by the outer contour of the object to obtain a target of the object and size information of the target; performing block division on an outer contour area of the object according to a preset relationship between the first depth and divided blocks to generate block information; and obtaining a volume of the object based on the block information, the size information, and a volume of the object.

BACKGROUND

With the rapid growth of logistics and transportation, the efficiency of the logistics and transportation process has gradually failed to meet the requirements of traditional transportation. The volume measurement of logistics goods is an important step in the logistics process. Volume measurement is the basis of goods circulation and transportation. It is very important to choose the right transportation vehicles, ships, and airplanes for the right volume. However, in the current logistics system, for the large volume measurement of pallet stacks, most of the object volume measuring work is still done by the traditional method using the tape measure.

In such a measurement method, the measurement error is large, and the volume estimation after measurement and the selection of appropriate means of transportation are all done manually. The low measurement efficiency of the traditional method will become an important factor hindering the improvement of transportation efficiency.

In order to solve this problem, the existing automated volume measurement technologies mostly use laser scanners and multi-vision fusion technology. A typical solution is to use one laser scanning emitter and four industrial cameras that are distributed around the object to be measured, and the size is measured by using the camera to capture the line laser emitted by the laser device. Although such a measurement method is more accurate and efficient than manual measurement, it requires a large area. Since the industrial camera must cover the viewing field of the object to be measured, the volume of which is almost twice that of the object to be measured. Therefore, the whole set of equipment also needs a stable bracket to fix it. In addition, such equipment is relatively complicated and must have expensive laser device and industrial cameras. The complicated system thus has high requirements for the hardware of the measurement equipment and the splicing and processing capabilities of the vision system.

In order to overcome the deficiencies of manual measurement and the existing automated measurement equipment, a method of volume measurement using modular 3D vision technology is proposed.

SUMMARY

In order to solve the above technical problem, the object of the present patent application is to provide a volume measurement method and system.

According to an aspect of the present patent application, a volume measurement method is provided, which comprises the following steps:

collecting a first information of a measurement area when there is no object to be measured and a first depth image information of the measurement area when there is an object to be measured under a current viewing angle based on a 3D vision system located above the measurement area;

identifying an outer contour of the object to be measured by comparing gray values of the first information and the first depth image information collected under different viewing angles to obtain a first depth information of the outer contour of the object to be measured, and filling in an area defined by the outer contour of the object to be measured to obtain a target of object to be measured and size information of the target of object to be measured;

performing block division on an outer contour area of the object to be measured according to a preset relationship between the first depth information and divided blocks to generate block information; and obtaining a volume of the object to be measured according to a preset relationship among the block information, the size information of the target of object to be measured, and a volume of the object to be measured.

Further, the 3D vision system comprises a first camera, a second camera, and a structured laser emitter; the structured laser emitter is configured to collect a first information of a measurement area when there is no object to be measured under a current viewing field, and judge whether a depth change of the measurement area exceeds a threshold according to laser grids; if it exceeds the threshold, determine that there is an object to be measured in the measurement area, drive the first camera to collect the first depth image of the measurement area, and drive the second camera to perform grayscale processing on the first depth image to generate the first depth image information.

Further, the outer contour of the object to be measured is matched with a standard double-layer calibration target of the 3D vision system based on an arrangement distance between the first camera and the second camera to obtain a size of the outer contour of the object to be measured.

The preset relationship between the first depth information and divided blocks satisfies:

$$w_1 \times \left| \frac{Target_{org}}{Target_{new}} \right| = \frac{w_2}{\text{Distance (Obstacles, Robot)}}$$

where $Target_{org}$ represents a boundary size of one of divided blocks, $Target_{new}$ represents a boundary size of a corresponding newly divided block after depth change, and Distance (Obstacles, Robot) is a function for calculating a depth and a size of a divided block, $w_1$ and $w_2$ are weight coefficients.

The preset relationship among the block information, the size information of the target of object to be measured, and a volume of the object to be measured satisfies:

$$V = w_1 \times (H_{org} - \sum H) \times \left|\frac{Target_{org}}{Target_{new}}\right|$$

where $H_{org}$ is a basic height value of the object to be measured in an image before block division, and H is a height value of a divided block in the outer contour area of the object to be measured in an image.

According to another aspect of the present patent application, a volume measurement system is provided, which comprises:

a unit for acquiring measurement area information configured to collect a first information of a measurement area when there is no object to be measured and a first depth image information of the measurement area when there is an object to be measured under a current viewing angle based on a 3D vision system located above the measurement area;

a unit for acquiring a target of object to be measured configured to identify an outer contour of the object to be measured by comparing gray values of the first information and the first depth image information collected under different viewing angles to obtain a first depth information of the outer contour of the object to be measured, and fill in an area defined by the outer contour of the object to be measured to obtain a target of object to be measured and size information of the target of object to be measured;

a block dividing unit configured to perform block division on an outer contour area of the object to be measured according to a preset relationship between the first depth information and divided blocks to generate block information; and a unit for acquiring a volume of object to be measured configured to obtain a volume of the object to be measured according to a preset relationship among the block information, the size information of the target of object to be measured, and a volume of the object to be measured.

Further, the 3D vision system comprises a first camera, a second camera, and a structured laser emitter; the structured laser emitter is configured to collect a first information of a measurement area when there is no object to be measured under a current viewing field, and judge whether a depth change of the measurement area exceeds a threshold according to laser grids; if it exceeds the threshold, determine that there is an object to be measured in the measurement area, drive the first camera to collect the first depth image of the measurement area, and drive the second camera to perform grayscale processing on the first depth image to generate the first depth image information.

Further, the unit for acquiring a target of object to be measured is further configured to match the outer contour of the object to be measured with a standard double-layer calibration target of the 3D vision system based on an arrangement distance between the first camera and the second camera to obtain a size of the outer contour of the object to be measured.

The 3D vision system is located right above the measurement area or located obliquely above the object to be measured in the measurement area.

The preset relationship between the first depth information and divided blocks satisfies:

$$w_1 \times \left|\frac{Target_{org}}{Target_{new}}\right| = \frac{w_2}{\text{Distance (Obstacles, Robot)}}$$

where $Target_{org}$ represents a boundary size of one of divided blocks, $Target_{new}$ represents a boundary size of a corresponding newly divided block after depth change, and Distance (Obstacles, Robot) is a function for calculating a depth and a size of a divided block, $w_1$ and $w_2$ are weight coefficients.

The preset relationship among the block information, the size information of the target of object to be measured, and a volume of the object to be measured satisfies:

$$V = w_1 \times (H_{org} - \sum H) \times \left|\frac{Target_{org}}{Target_{new}}\right|$$

where $H_{org}$ is a basic height value of the object to be measured in an image before block division, and H is a height value of a divided block in the outer contour area of the object to be measured in an image.

According to another aspect of the present patent application, there is provided an apparatus, which comprises:
one or more processors; and
a memory configured to store one or more programs,
wherein when executed by the one or more processors, the one or more programs cause the one or more processors to execute the method described in any one of the above.

According to another aspect of the present patent application, there is provided a computer-readable storage medium having a computer program stored thereon, wherein when the computer program is executed by a processor, the method described in any of the above items is implemented.

Compared with the prior art, the present patent application has the following beneficial effects:

1. The volume measurement method according to the present patent application collects a first information of a measurement area when there is no object to be measured and a first depth image information of the measurement area when there is an object to be measured under a current viewing angle based on a 3D vision system located above the measurement area; identifies an outer contour of the object to be measured by comparing gray values of the first information and the first depth image information collected under different viewing angles to obtain a first depth information of the outer contour of the object to be measured, and fills in an area defined by the outer contour of the object to be measured to obtain a target of object to be measured and size information of the target of object to be measured; performs block division on an outer contour area of the object to be measured according to a preset relationship between the first depth information and divided blocks to generate block information; and obtains a volume of the object to be measured according to a preset relationship among the block information, the size information of the target of object to be measured, and a volume of the object to be measured. The method performs measurement based on a 3D vision system and directly measure the volume of the object to be measured, so the measurement speed is fast, the measurement accuracy is high and the measurement range is large.

2. In the volume measurement system according to the present patent application, the structure of each unit is simple. The units cooperate with each other to perform measurement based on a 3D vision system. In addition, the vision system is properly laid-out and arranged to greatly reduce the space occupied. Moreover, it can directly measure the object to be measured, so the measurement speed is fast, the measurement accuracy is high and the measurement range is large. Thus, it effectively avoids the disadvantages of occupying a large space and having a complicated structure and high functional configuration requirements in the existing measurement apparatus.

3. The apparatus and the computer-readable storage medium having a computer program stored thereon according to the present patent application can measure the volume of the object to be measured by using a 3D vision system which occupies a small space and has low device performance requirements, so the measurement speed is fast, the measurement accuracy is high, the measurement range is large, and thus they are worthy of promotion.

DETAILED DESCRIPTION

In order to better understand the technical solutions of the present patent application, the present patent application will be further described below in conjunction with specific embodiments and accompanying drawings.

First Embodiment

The present embodiment provides a volume measurement system, comprising:

a unit for acquiring measurement area information, configured to collect a first information of a measurement area when there is no object to be measured and a first depth image information of the measurement area when there is an object to be measured under a current viewing angle based on a 3D vision system located above the measurement area;

a unit for acquiring a target of object to be measured, configured to identify an outer contour of the object to be measured by comparing gray values of the first information and the first depth image information collected under different viewing angles to obtain a first depth information of the outer contour of the object to be measured, and fill in an area defined by the outer contour of the object to be measured to obtain a target of object to be measured and size information of the target of object to be measured;

a block dividing unit, configured to perform block division on an outer contour area of the object to be measured according to a preset relationship between the first depth information and divided blocks to generate block information; and a unit for acquiring a volume of object to be measured, configured to obtain a volume of the object to be measured according to a preset relationship among the block information, the size information of the target of object to be measured, and a volume of the object to be measured.

The 3D vision system comprises a first camera, a second camera, and a structured laser emitter. The structured laser emitter is configured to collect a first information of a measurement area when there is no object to be measured under a current viewing field, and judge whether a depth change of the measurement area exceeds a threshold according to laser grids; if it exceeds the threshold, determine that there is an object to be measured in the measurement area, drive the first camera to collect the first depth image of the measurement area, and drive the second camera to perform grayscale processing on the first depth image to generate the first depth image information.

The unit for acquiring a target of object to be measured is further configured to match the outer contour of the object to be measured with a standard double-layer calibration target of the 3D vision system based on an arrangement distance between the first camera and the second camera to obtain a size of the outer contour of the object to be measured.

The first camera is specifically a color camera used to take a full picture of the object to be measured, and the second camera is specifically a black-and-white camera mainly used for gray processing. At the same time, the two cameras are installed with a fixed distance between them, and the infrared laser detected by them can assist measuring distance. The structured laser emitter is specifically a structured laser emitter with coding characteristics, and is the most important direct sensor for measuring distance. The coding characteristic can effectively avoid the interference of visible light and other light beams of the same type.

The 3D vision system is located right above the measurement area or obliquely above the object to be measured in the measurement area.

The preset relationship between the first depth information and divided blocks satisfies:

$$w_1 \times \left| \frac{Target_{org}}{Target_{new}} \right| = \frac{w_2}{Distance(Obstacles, Robot)}$$

where $Target_{org}$ represents a boundary size of one of divided blocks, $Target_{new}$ represents a boundary size of a corresponding newly divided block after depth change, and Distance (Obstacles, Robot) is a function for calculating a depth and a size of a divided block, $w_1$ and $w_2$ are weight coefficients.

The preset relationship among the block information, the size information of the target of object to be measured, and a volume of the object to be measured satisfies:

$$V = w_1 \times (H_{org} - \sum H) \times \left| \frac{Target_{org}}{Target_{new}} \right|$$

where $H_{org}$ is a basic height value of the object to be measured in an image before block division, and H is a height value of a divided block in the outer contour area of the object to be measured in an image.

Figure 1:
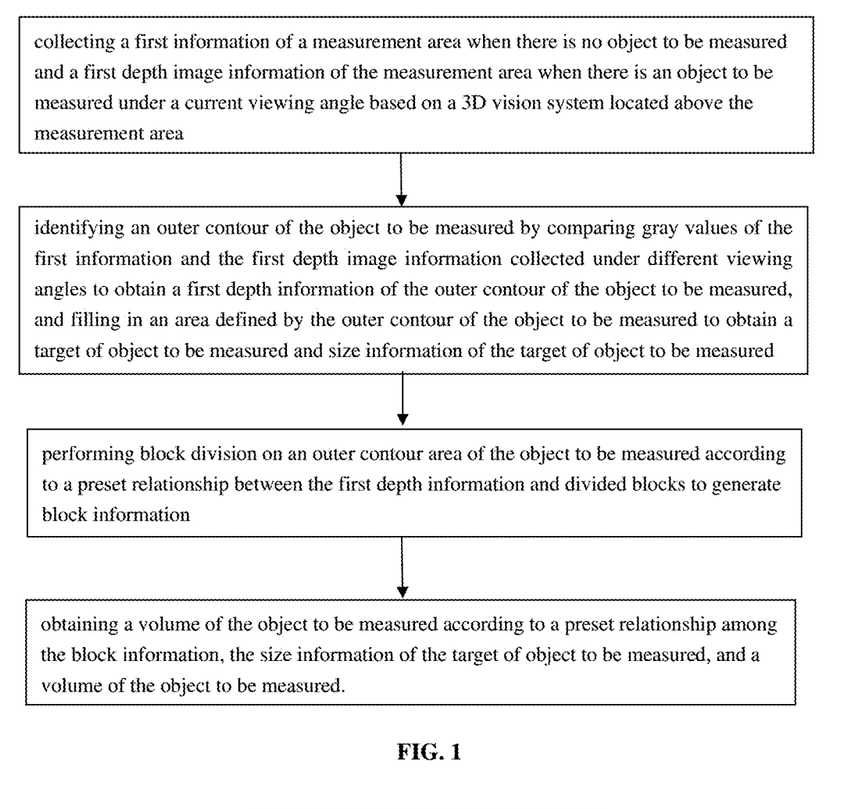
FIG. 1 is a flowchart according to a first embodiment.

The present embodiment provides a volume measurement method. As shown in FIG. 1, it comprises the following steps:

S1: collecting a first information of a measurement area when there is no object to be measured and a first depth image information of the measurement area when there is an object to be measured under a current viewing angle based on a 3D vision system. The 3D vision system is located above the measurement area. Specifically, it is located right above the measurement area or obliquely above the object to be measured in the measurement area.

The 3D vision system comprises a first camera, a second camera, and a structured laser emitter. The structured laser emitter is configured to collect a first information of a measurement area when there is no object to be measured under a current viewing field, and judge whether a depth change of the measurement area exceeds a threshold according to laser grids; if it exceeds the threshold, determine that there is an object to be measured in the measurement area, drive the first camera to collect the first depth image of the measurement area, and drive the second camera to perform grayscale processing on the first depth image to generate the first depth image information.

S2: identifying an outer contour of the object to be measured by comparing gray values of the first information and the first depth image information collected under different viewing angles to obtain a first depth information of the outer contour of the object to be measured, and filling in an area defined by the outer contour of the object to be measured to obtain a target of object to be measured and size information of the target of object to be measured.

The outer contour of the object to be measured is matched with a standard double-layer calibration target of the 3D vision system based on an arrangement distance between the first camera and the second camera to obtain a size of the outer contour of the object to be measured.

S3: performing block division on an outer contour area of the object to be measured according to a preset relationship between the first depth information and divided blocks to generate block information.

The preset relationship between the first depth information and divided blocks satisfies:

$$w_1 \times \left|\frac{Target_{org}}{Target_{new}}\right| = \frac{w_2}{Distance\ (Obstacles, Robot)}$$

where $Target_{org}$ represents a boundary size of one of divided blocks, $Target_{new}$ represents a boundary size of a corresponding newly divided block after depth change, and Distance (Obstacles, Robot) is a function for calculating a depth and a size of a divided block, $w_1$ and $w_2$ are weight coefficients.

S4: obtaining a volume of the object to be measured according to a preset relationship among the block information, the size information of the target of object to be measured, and a volume of the object to be measured.

The preset relationship among the block information, the size information of the target of object to be measured, and a volume of the object to be measured satisfies:

$$V = w_1 \times \left(H_{org} - \sum H\right) \times \left|\frac{Target_{org}}{Target_{new}}\right|$$

where $H_{org}$ is a basic height value of the object to be measured in an image before block division, and H is a height value of a divided block in the outer contour area of the object to be measured in an image.

The 3D vision system is specifically a set of integrated 3D vision sampling modules. The sampling modules comprise a color camera, a black-and-white camera, and a structured laser emitter with coding characteristics. The original parts used in the modules are available in the current market. For example, cameras and laser modules commonly used in the mobile phone industry can be used. The overall module is very economical.

Figure 2:
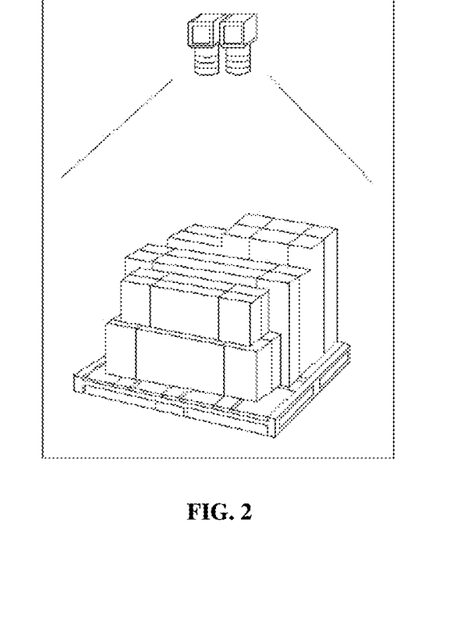
FIG. 2 is a schematic diagram of the top installation of a 3D vision acquiring module according to a first embodiment.

The layout of the 3D vision sampling module has been designed in multiple dimensions. The most common layout is to place it right above the object to be measured, as shown in FIG. 2. The advantage of such a layout is that a large viewing field space can be covered using a single 3D vision module. Combined with coded structured light, the measurement accuracy can be maximized. The top installation occupies a very small space, and can be realized using a pillar suspended from the ceiling. Such an installation method completely releases the bottom space and the net space is unprecedentedly huge.

The core of the volume measurement method of the present patent application is a volume measurement method combining 3D vision with real physical space. The specific steps are as follows.

S1. When there is no object to be measured in the viewing field, the depth ray model of the current viewing field area is modeled, a low-power mode is used to encode the laser grids in low latitude, and the measurement area defined by the viewing field is grayscale processed. When an object enters the measurement area, the depth ray will be interfered. At this point, the measurement system is turned on to perform laser speckle in high latitude and grid laser transformation to increase the area scanning frequency.

S2. The boundary is recognized.

Figure 3:
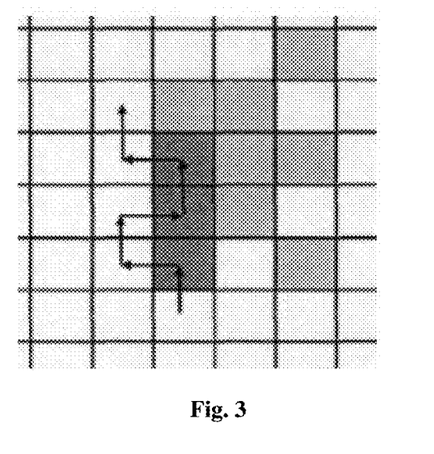
FIG. 3 is a schematic diagram of an outer contour of the object to be measured in an image according to a first embodiment.
Figure 4:
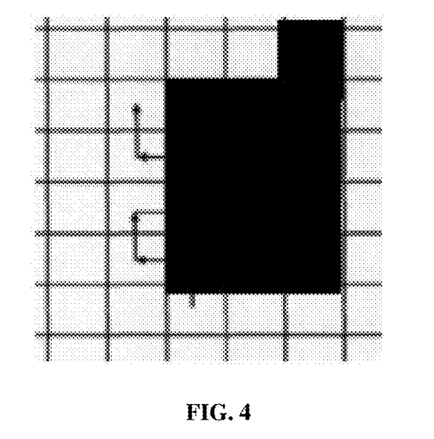
FIG. 4 is a schematic diagram of filling in the outer contour area of the object to be measured in the image according to a first embodiment.

The boundary of the object to be measured is scanned, and the largest outer contour of the object to be measured is determined by comparing the gray value changes before and after the object entered. Then the area contained in the edge area is filled in. Based on this information, the largest possible object volume information can be obtained, as shown in FIG. 3 to FIG. 4.

The maximum outer contour of the object to be measured is the size of outer edges, which can be directly obtained by matching the standard double-layer calibration target. The purpose of determining this size is to determine the maximum boundary of divided blocks. The calibration target calibrates the accuracy of two size at one time. According to a fixed depth, a zoom factor of the size accuracy is calculated in equal proportion. If the depth is greater, the measurement size is larger, and the error will also be larger, so the zoom ratio is used to reduce the error and needs to be calibrated before leaving the factory.

The depth ray is based on the laser ranging sensor ToF technology, which detects whether there is an object in the area, and then turns on the camera to perform measurement, so as to avoid the excessive heat produced by the camera after long working hours. The ToF range sensor is set according to the parameters when there is no object. At this point, the camera sleeps and does not acquire images. The detection of the presence or absence of the object to be measured relies on encoded laser grid in low latitude checking whether there is a depth change in the measurement area.

S3. The outer contour of the object to be measured is divided into blocks.

Accurate recognition of the object to be measured can improve the measurement accuracy. The recognition accuracy can reach an error of ±10 mm for 1 meter length. The block division is performed on the outer contour of the object to be measured obtained in step (1). The block division is made in a non-linear growth manner based on the depth information. The nonlinearity changes according to the distortion correction coefficient of the lens of camera. The nonlinear growth and correction coefficients are set in the system according to the lens when leaving the factory and are finally reflected in the function Distance(Obstacles, Robot), $$w_1 \times \left| \frac{Target_{org}}{Target_{new}} \right| = \frac{w_2}{Distance\ (Obstacles, Robot)}$$

where $Target_{org}$ represents a boundary size of a divided block (i.e., a boundary size of one of the blocks after division); $Target_{new}$ represents a boundary size of a newly divided block after depth change (i.e., a boundary size of a corresponding newly divided block after depth change); Distance (Obstacles, Robot) is a function for calculating a depth and a size of a divided block; $w_1$ and $w_2$ are weight coefficients. According to the difference caused by the block division, a new block has a new depth, and the depths of adjacent blocks are not the same.

Figure 5:
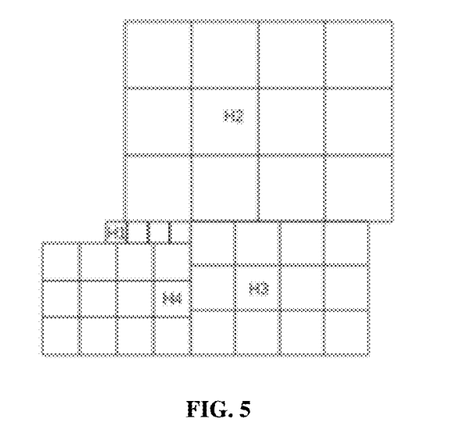
FIG. 5 is a schematic diagram of block division of the outer contour area of the object to be measured according to a first embodiment.

S4. An example of the blocks divided in this way is as shown in FIG. 5. The depth information is filled in each block area, and the volume distribution is accurately measured. It can be concluded that in the part close to the camera, the block divided is large and the quantity of blocks is small; in the part far from the camera, the block divided is small and the quantity of blocks is large. In the blocks divided of the same size, the average value of the depth information is calculated. The volume of the object is the sum of the product of the average value of all blocks of the same size and the area occupied by the blocks of the same size.

$$V = w_1 \times (H_{org} - \sum H) \times \left| \frac{Target_{org}}{Target_{new}} \right|$$

where $H_{org}$ is a basic height value of the object to be measured in an image before block division, H is a height value of a divided block in the outer contour area of the object to be measured in an image, and V is the total volume after measurement.

The volume measurement method of the present patent application proposes a new and simple algorithm which is a defining and accurate measurement method. Compared with the point cloud and triangulation method, this method greatly improves the computing performance Combined with the simple and compact space layout, a fast and accurate volume measurement function is realized. The present patent application may be used alone as a separate measurement system module. It may also combine the weighing system and the barcode scanning system in the logistics industry to output complete cargo information. This method effectively improves equipment performance and logistics capabilities, reduces complexity of equipment, and is easy to install and use.

The volume measurement algorithm does not need to transform the two-dimensional coordinates in the vision system into real three-dimensional space coordinates, and can directly calculate the volume of the object to be measured using limited information, so the method is simple and practical.

As another aspect, the present embodiment further provides an apparatus suitable for implementing the method according to the embodiments of the present application. The apparatus includes a computer system. The computer system includes a central processing unit (CPU) that performs a variety of appropriate actions and processes according to a program stored in a read only memory (ROM) or loaded from a storage section into a random access memory (RAM). In the RAM, various programs and data necessary for the operation of the device are also stored. The CPU, ROM, and RAM are connected to each other by a bus. An input/output (I/O) interface is also connected to the bus.

The following components are connected to the I/O interface: an input section including a keyboard or a mouse or the like; an output section including a display such as a cathode ray tube (CRT) or a liquid crystal display (LCD), a storage section including a hard disk or the like, and a communication section including a network interface card such as a LAN card or a modem. The communication section performs communication processing via a network such as the Internet. The drive is also connected to the I/O interface as needed. A removable medium, such as a magnetic disk, an optical disk, a magneto-optical disk or a semiconductor memory, is mounted on the drive as needed so that a computer program read out therefrom is installed into the storage section as needed.

In particular, according to an embodiment of the present disclosure, the process described above with reference to the FIG. 1 may be implemented as a computer software program. For example, an embodiment of the present disclosure includes a computer program product comprising a computer program tangibly embodied on a machine-readable medium, and the computer program includes program code for executing the method of FIG. 1. In such an embodiment, the computer program may be downloaded and installed from the network through the communication section, and/or installed from a removable medium.

The flowcharts in the drawings illustrate system architecture, functions and operations that may be implemented by device, method and computer program product according to the embodiments of the present patent application. In this regard, each block in the flowchart can represent a module, a part of program segment or code, wherein the module and the part of program segment or code include one or more executable instructions for performing stipulated logic functions. It should also be noted that, in some alternative implementations, the functions indicated in the block can also take place in an order different from the one indicated in the drawings. For example, two successive blocks can be in fact executed in parallel or sometimes in a reverse order, which depends on the functions involved. It should also be noted that, each block in the flowchart and combinations of the blocks in the flowchart can be implemented by a hardware-based system exclusive for executing stipulated functions or actions, or by a combination of dedicated hardware and computer instructions.

The units or modules described in the embodiments of the present application can be implemented in software or hardware. The units or modules described can also be provided in the processor. The names of these units or modules do not constitute a limitation on the units or modules themselves under certain circumstances.

As another aspect, the present embodiment further provides a computer-readable storage medium. The computer-readable storage medium may be the computer-readable storage medium included in the system described in the foregoing embodiment. Alternatively, it may be computer-readable storage medium that exist separately and is not installed into any equipment. The computer-readable storage medium stores one or more programs, and the programs are executed by one or more processors to perform the volume measurement method described in the present application.

Second Embodiment

The features of the present embodiment that are the same as those of the first embodiment will not be repeated here.

Figure 6:
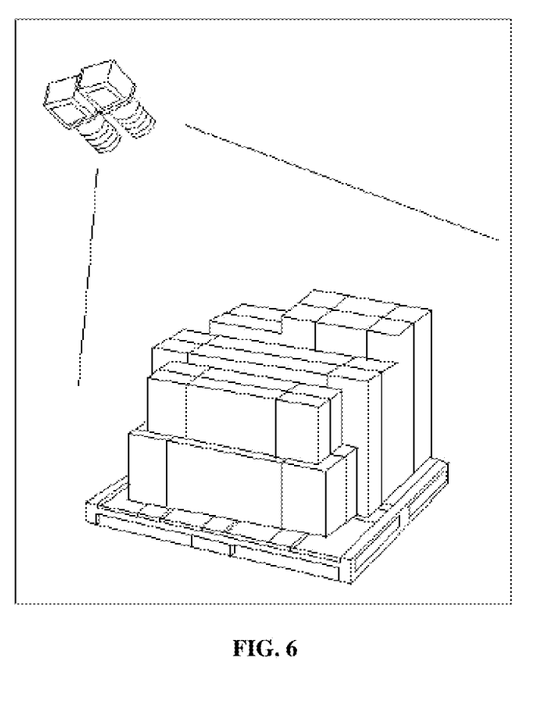
FIG. 6 is a schematic diagram of the oblique installation of a 3D vision acquiring module according to a first embodiment.

The present embodiment is different from the first embodiment in that, the 3D vision acquiring module can be placed obliquely above the three-dimensional diagonal of the object to be measured. As shown in FIG. 6, the observation angle of the camera can cover three main faces of the entire object to be measured. By solving the information of the three faces, more volume details can be obtained, and thus the measurement accuracy can be improved. Similarly, this installation method is simple and occupies a small space. A picture of the object to be measured can be taken while measuring the volume.

The above only describes preferred embodiments of the present application and the technical principles used. A person skilled in the art should understand that the scope of the present application is not limited to the technical solutions formed by a specific combination of the above technical features, and should also cover other technical solutions formed by any combination of the above technical features or their equivalent features without departing from the inventive concept. For example, a solution can be obtained by combining the above features and features having similar functions as those disclosed (but not limited to) in this application.

What is claimed is:

1. A volume measurement method, comprising the following steps:
   collecting a first information of a measurement area when there is no object to be measured and a first depth image information of the measurement area when there is an object to be measured under a current viewing angle based on a 3D vision system located above the measurement area;
   identifying an outer contour of the object to be measured by comparing gray values of the first information and the first depth image information collected under different viewing angles to obtain a first depth information of the outer contour of the object to be measured, and filling in an area defined by the outer contour of the object to be measured to obtain a target of object to be measured and size information of the target of object to be measured;
   performing block division on an outer contour area of the object to be measured according to a preset relationship between the first depth information and divided blocks to generate block information; and
   obtaining a volume of the object to be measured according to a preset relationship among the block information, the size information of the target of object to be measured, and a volume of the object to be measured, wherein the preset relationship between the first depth information and divided blocks satisfies:

$$w_1 \times \left| \frac{Target_{org}}{Target_{new}} \right| = \frac{w_2}{\text{Distance (Obstacles, Robot)}}$$

where $Target_{org}$ represents a boundary size of one of divided blocks, $Target_{new}$ represents a boundary size of a corresponding newly divided block after depth change, and Distance (Obstacles, Robot) is a function for calculating a depth and a size of a divided block, $w_1$ and $w_2$ are weight coefficients;
wherein the preset relationship among the block information, the size information of the target of object to be measured, and a volume of the object to be measured satisfies:

$$V = w_1 \times \left( H_{org} - \sum H \right) \times \left| \frac{Target_{org}}{Target_{new}} \right|$$

where $H_{org}$ is a basic height value of the object to be measured in an image before block division, and H is a height value of a divided block in the outer contour area of the object to be measured in an image.

2. The volume measurement method according to claim 1, wherein the 3D vision system comprises a first camera, a second camera, and a structured laser emitter, and
   the structured laser emitter is configured to collect a first information of a measurement area when there is no object to be measured under a current viewing field, and judge whether a depth change of the measurement area exceeds a threshold according to laser grids; if it exceeds the threshold, determine that there is an object to be measured in the measurement area, drive the first camera to collect the first depth image of the measurement area, and drive the second camera to perform grayscale processing on the first depth image to generate the first depth image information.

3. The volume measurement method according to claim 2, wherein the outer contour of the object to be measured is matched with a standard double-layer calibration target of the 3D vision system based on an arrangement distance between the first camera and the second camera to obtain a size of the outer contour of the object to be measured.

4. A non-transitory tangible computer-readable storage medium having a computer program stored thereon, wherein when the computer program is executed by a processor, the method according claim 1 is implemented.

5. A volume measurement system, comprising:
   a unit for acquiring measurement area information configured to collect a first information of a measurement area when there is no object to be measured and a first depth image information of the measurement area when there is an object to be measured under a current viewing angle based on a 3D vision system located above the measurement area;
   a unit for acquiring a target of object to be measured configured to identify an outer contour of the object to be measured by comparing gray values of the first information and the first depth image information collected under different viewing angles to obtain a first depth information of the outer contour of the object to be measured, and fill in an area defined by the outer contour of the object to be measured to obtain a target of object to be measured and size information of the target of object to be measured;

a block dividing unit configured to perform block division on an outer contour area of the object to be measured according to a preset relationship between the first depth information and divided blocks to generate block information; and a unit for acquiring a volume of object to be measured configured to obtain a volume of the object to be measured according to a preset relationship among the block information, the size information of the target of object to be measured, and a volume of the object to be measured, wherein the preset relationship between the first depth information and divided blocks satisfies:

$$w_1 \times \left| \frac{Target_{org}}{Target_{new}} \right| = \frac{w_2}{\text{Distance (Obstacles, Robot)}}$$

where $Target_{org}$ represents a boundary size of one of divided blocks, $Target_{new}$ represents a boundary size of a corresponding newly divided block after depth change, and Distance (Obstacles, Robot) is a function for calculating a depth and a size of a divided block, $w_1$ and $w_2$ are weight coefficients;

wherein the preset relationship among the block information, the size information of the target of object to be measured, and a volume of the object to be measured satisfies:

$$V = w_1 \times \left( H_{org} - \sum H \right) \times \left| \frac{Target_{org}}{Target_{new}} \right|$$

where $H_{org}$ is a basic height value of the object to be measured in an image before block division, and H is a height value of a divided block in the outer contour area of the object to be measured in an image.

6. The volume measurement system according to claim 5, wherein the 3D vision system comprises a first camera, a second camera, and a structured laser emitter, and the structured laser emitter is configured to collect a first information of a measurement area when there is no object to be measured under a current viewing field, and judge whether a depth change of the measurement area exceeds a threshold according to laser grids; if it exceeds the threshold, determine that there is an object to be measured in the measurement area, drive the first camera to collect the first depth image of the measurement area, and drive the second camera to perform grayscale processing on the first depth image to generate the first depth image information.

7. The volume measurement system according to claim 6, wherein the unit for acquiring a target of object to be measured is further configured to match the outer contour of the object to be measured with a standard double-layer calibration target of the 3D vision system based on an arrangement distance between the first camera and the second camera to obtain a size of the outer contour of the object to be measured.

8. The volume measurement system according to claim 5, wherein the 3D vision system is located right above the measurement area or located obliquely above the object to be measured in the measurement area.

9. The volume measurement system according to claim 5, wherein the system comprises:

one or more processors; and a memory configured to store one or more programs, wherein the units are implemented by the one or more processors and/or by the one or more programs.

* * * * *